June 27, 1967  H. R. SIMON  3,328,064
AUTOMOTIVE ACCESSORIES
Filed Aug. 30, 1965
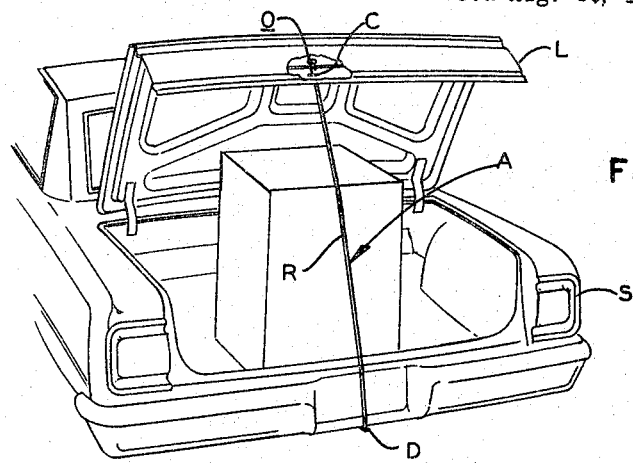
FIG. 1
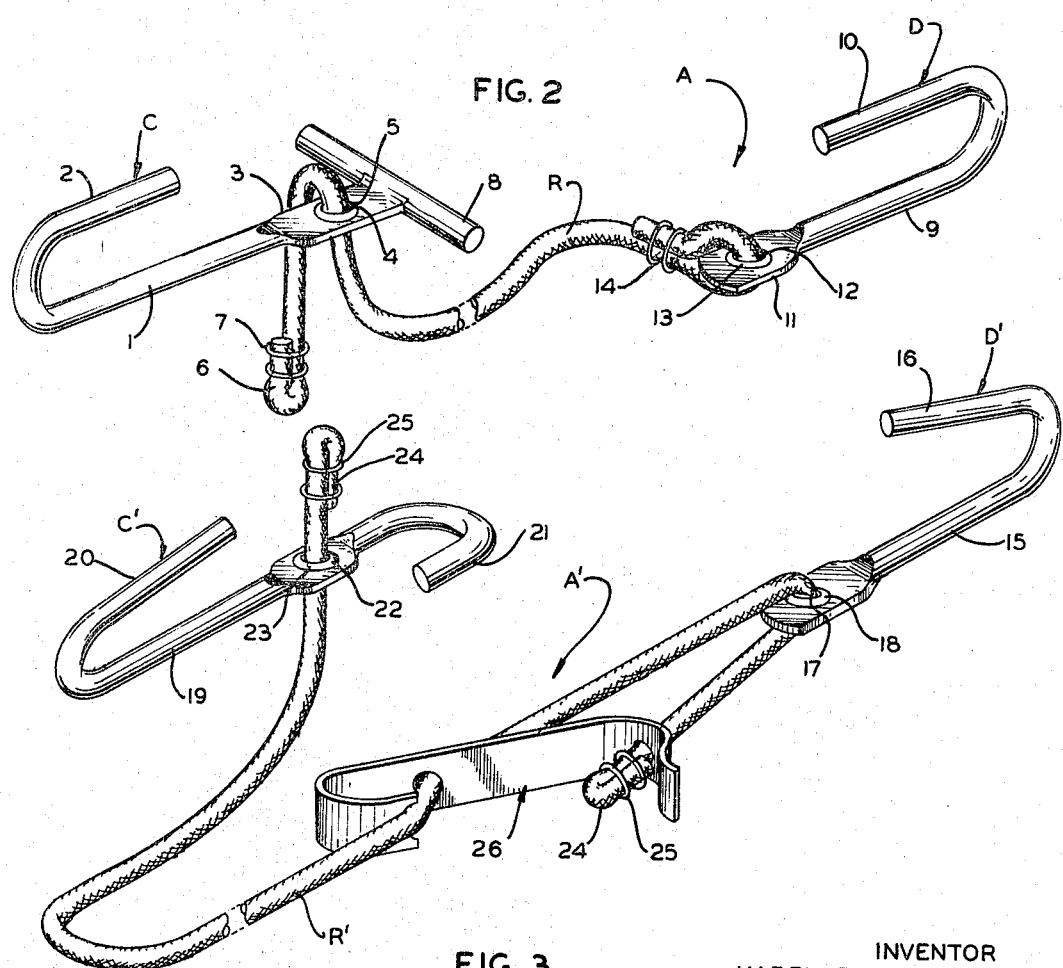
FIG. 2
FIG. 3
INVENTOR
HARRY R. SIMON
BY
*Robert J. Schaap*
ATTORNEY

United States Patent Office 3,328,064
Patented June 27, 1967

3,328,064
AUTOMOTIVE ACCESSORIES
Harry R. Simon, University City, Mo., assignor to Richard Engineering Company, a corporation of Missouri
Filed Aug. 30, 1965, Ser. No. 483,409
7 Claims. (Cl. 292—288)

ABSTRACT OF THE DISCLOSURE

A tying mechanism for securing a trunk lid to a trunk-forming compartment with an oversized load contained therein wherein the mechanism includes a hook removably attached to the lid and a hook removably attached to the compartment with a rope therebetween. A first embodiment of the hook has a shank and pair of reversely bent fingers, one of which is rotated 90° about the shank. A second embodiment of the hook has a shank, reversely bent finger and laterally extending crossbars for winding excess rope therearound.

---

This invention relates in general to certain new and useful improvements in automotive accessories, and more particularly, to an improved mechanism for retaining a trunk lid of an automotive vehicle in a stable position.

Today, it is a very common practice to haul items of a large and bulky nature in the trunk of an automobile. In many cases, the material being transported in the trunk of an automobile is too large to permit complete closing of the trunk lid. If the trunk lid is spring biased or weighted so that it always pivots to its uppermost position when unlocked, it is incumbent upon the driver to tie the trunk lid in a lower position. It is generally necessary to tie the trunk lid in a firm position even if the same is not spring biased, in order to prevent oscillatory movement of the trunk lid while driving.

In older model automobiles, tying the trunk lid to some other stationary part of the automobile presented no particular problem. However, in the newer model automobiles, no handle protrudes from the exterior surface of the trunk lid and similarly, no protruding items extend from the interior surface of the trunk lid on which to tie a rope. Moreover, the back panels of the modern automobiles are generally flat or provide no element which is capable of holding a rope. As a result thereof, the party hauling in one of the newer model automobiles encounters great difficulty in positioning the trunk lid in a secure position with large and bulky loads.

There have been various attempts to overcome this problem, and all of such attempts thus far have been rather unsuccessful. One of the devices thus far developed employs a stretchable rope for securing the trunk lid to a stationary member of the automobile. However, often times a jar of a trunk lid was sufficient to cause the biasing force on the lid to overcome the spring rate constant of the rope, thereby causing the trunk lid to bounce.

It is, therefore, the primary object of the present invention to provide a clamping mechanism for securing a swingable member with respect to a stationary member in any of a plurality of selected positions.

It is another object of the present invention to provide a clamping mechanism of the type stated which is primarily adaptable for use in securing a trunk lid to an automobile.

It is an additional object of the persent invention to provide a clamping mechanism of the type stated which is relatively simple to employ and quite efficient in its operation.

It is a further object of the present invention to provide a clamping mechanism of the type stated which is relatively inexpensive to manufacture.

With the above and other objects in view, my invention resides in the novel features of form, construction, arrangement and combination of parts presently describe and pointed out in the claims.

In the accompanying drawing:

FIGURE 1 is a perspective view of a clamping mechanism constructed in accordance with and embodying the present invention and showing the operative attachment to the bumper and trunk lid of an automobile;

FIGURE 2 is a perspective view, partially broken away, of the clamping mechanism of the persent invention and showing in detail the hooks forming a part thereof; and FIGURE 3 is a perspective view partially broken away, of a modified form of clamping mechanism of the present invention and showing in detail the hooks forming a part thereof.

Generally speaking, the present invention relates to a clamping device comprising two specially designed hooks with an interconnecting flexible member such as a rope. One of the hooks is designed to engage some aperture usually formed on the inner plate of a trunk lid and the other of the hooks is designed to engage the underside of an automobile bumper. The flexible member is designed to extend between eyelets on the two hooks and the size of the member extending between the two eyelets can be regulated for securing the trunk lid in a position where it rests on a load in the trunk.

Referring now in more detail and by reference characters to the drawings which illustrate practical embodiments of the present invention, A designates a clamping device for securing a trunk lid L to a stationary portion of an automobile S and generally comprises a pair of hooks C and D and a flexible rope R.

The hook C is the upper hook and comprises a shank 1 having an integrally formed reversely bent hook engaging finger 2 which is designed to extend through an aperture O formed in a panel of the trunk lid C. By reference to FIGURE 2, it can be seen that the finger 2 extends in a direction substantially parallel to the shank 1. Most of the newer model automobiles are constructed with an inner panel slightly spaced from the trunk lid for housing wires, lock mechanism, etc. The inner panel is generally provided with one or more apertures O providing access to these components. The hook shank 1 is planished at the end opposite the finger 2 in the form of a relatively flat plate 3 which is in turn provided with an eyelet 4 for accommodating the rope R. The eyelet 4 may be provided with a grommet 5 to prevent undue wear of the rope R. One end of the rope R is threaded through the eyelet 4 and secured in the form of a knot 6, through the use of hog ring clamps 7 so the knot 6 will not slip through the eyelet 4. The free end of the flat plate 3 is integrally formed with a cross bar 8 so that the rope R may be wound therearound to take up excess slack in the rope R.

The hook D is somewhat similar to the hook C and generally comprises a shank 9 with an integrally formed hook engaging finger 10. The finger 10 is sized to extend under and engage the underside of an automobile rear bumper. The shank 9 is also planished in the form of a flat plate 11 and formed with an eyelet 12 at the end opposite the finger 10, and the rope R is threaded through the eyelet 12. The eyelet 12 may also be provided with a grommet 13. By reference to FIGURE 2, it can be seen that the rope R is knotted at 14, in the same manner as the opposite end so that it is permanently retained in the eyelet 12. In this connection, it should be noted that the rope R may be constructed of any flexible material such as hemp or braided nylon. However, the rope R should be sufficiently thin so that it can be handled with ease and yet sufficiently strong to yield against severing from sudden jars of an automotive vehicle on which it is used. It should also be noted that a cable or similar flexible member may be substituted for a rope. In the event that a metal cable is used, it should be recognized that cable clamps may be employed.

In use, the clamping mechanism A can be conveniently and rapidly used. It is sufficiently small, compact and light in weight so that it can be stored in the trunk of an automotive vehicle. Moreover, the hooks C and D may be formed of an anodized aluminum, zinc plated iron or stainless steel to resist corrosion. Zinc plated iron is the preferred material of construction due to inexpensive material cost and ease of forming.

The clamping mechanism A is generally designed for use where the automotive vehicle trunk lid cannot be completely closed because of a large package or number of bulky items contained in the vehicle trunk compartment. The trunk lid is pulled down until the interior surface rests on the package contained in the trunk compartment. The first hook C is used so that the hook engaging finger 2 extends through an aperture O formed in a panel of the trunk lid L. In this connection, it should also be recognized that the finger 2 may extend around any available engageable surface.

The hook D is used so that the finger 10 engages the underside of the automotive vehicle bumper or any other available portion of the vehicle which is stationary with respect to the trunk lid L. The rope R is then tightened by pulling the same through the eyelet 4 and winding and tying the rope R on the crossbar 8 so that the desired amount of tension is maintained thereon. When the trunk lid L is thus firmly supported on a package contained in the trunk compartment, the automotive vehicle can be moved. The clamping mechanism A is also easily removable by merely untying and unwinding the rope R from the crossbar 8 and removing the hooks C and D from their respective hook engaging surfaces.

It is possible to provide a modified form of clamping mechanism A' which is substantially similar to the clamping mechanism A and is illustrated in FIGURE 3. The clamping mechanism A' is also provided with a pair of hooks C', D'. The hook D' is provided with a shank 15 having a reversely bent hook engaging finger 16 which is angularly disposed with respect to the shank 15. The shank 15 is planished, provided with eyelet 17 and may be provided with a grommet 18 for slidably accommodating a rope R'. The upper hook C' is provided with a shank 19 having an integrally formed reversely bent hook engaging finger 20 which is angularly disposed with respect to the shank 19. At its opposite end, the hook C' is integrally formed with another reversely bent hook engaging finger 21 which extends in a direction substantially parallel to the shank 19. However, the finger 21 may be substantially shorter than the finger 20, as illustrated. The finger 21 is also rotated approximately 90° from the finger 20 about the axial centerline of the shank 19 in the manner as shown in FIGURE 3. By this construction, either one finger 20 or 21 may be used to engage the aperture O in the trunk lid L if the other will not fit. The finger which is not used to engage the aperture may then be used as a member for winding excess rope R' to take up slack. The terminal end of the rope R' may then be securely tied to the free hook or to the rope R' itself as desired.

The shank 19 is planished intermediate its two ends, provided with an eyelet 22 and may be provided with a grommet 23 for accommodating the rope R'. The end of the rope R' is then secured in a knot 24 with hog ring clamps 25. The opposite end of the rope R' is slipped through one aperture in a conventional slack take-up device 26 of the type normally found in tents. The portion of the rope R' interconnecting the two clamps C', D' is also passed through the opposite aperture in the take-up device 26.

The clamping mechanism A' is used in a manner substantially similar to the clamping mechanism A except that the hooks C', D' may be used more conveniently in certain applications than the hooks C and D. Moreover, the slack take-up device 26 may be employed to take up excess slack. It should be recognized that the slack take-up device 26 may be used on the clamping mechanism A as well and moreover, the hooks C and C' are interchangeable and the hooks D and D' are interchangeable.

When used in the claims herein, the term "trunk forming compartment" is defined as any portion of the automotive vehicle which is stationary with respect to the trunk lid.

It should be understood that changes and modifications can be made in the form, construction, arrangement and combination of parts presently described and pointed out without departing from the nature and principle of my invention.

Having thus described my invention, what I desire to claim and secure by Letters Patent is:

1. A clamping mechanism for securing a swingable member with respect to a stationary member and wherein the stationary member and swingable member have hook engageable surfaces; said clamping mechanism comprising a first hook engageable with the hook engageable surface of said stationary member, a second hook engageable with the hook engageable surface of said swingable member, and flexible connecting means interconnecting each of said hooks, said flexible connecting means being permanently secured at one end in such manner that it is not separable from one of said hooks, one of said hooks having a shank and a pair of oppositely disposed reversely bent hook forming fingers which extend in directions substantially parallel to the shank, one of said hook forming fingers being rotated to a position approximately 90° about said shank with respect to the other of said hook forming fingers, said hook being provided with an aperture for accommodating said flexible connecting means, either one of said hook forming fingers being capable of receiving excess length of the flexible connecting means for adjusting the length of said flexible connecting means to secure the swingable member at a selected position with respect to said stationary member.

2. A clamping mechanism for securing a swingable member with respect to a stationary member and wherein the stationary member and swingable member have hook engageable surfaces; said clamping mechanism comprising a first hook engageable with the hook engageable surface of said stationary member, a second hook engageable with the hook engageable surface of said swingable member, and flexible connecting means interconnecting each of said hooks, said flexible connecting means being permanently secured at one end in such manner that it is not separable from one of said hooks, one of said hooks having a shank and a pair of oppositely disposed reversely bent hook forming fingers which extend in directions substantially parallel to the shank, one of said hook forming fingers being rotated to a position approximately 90° about said shank with respect to the other of said hook forming fingers, said shank being provided intermediate each of the hook forming fingers with an aperture for accommodating said flexible connecting means, either one of said hook forming fingers being capable of receiving excess length of the flexible connecting means for adjusting the length of said flexible connecting means to secure the swingable member at a selected position with respect to said stationary member.

3. A clamping mechanism for securing a swingable member with respect to a stationary member and wherein the stationary member and swingable member have hook engageable surfaces; said clamping mechanism comprising a first hook engageable with the hook engageable surface of said stationary member, a second hook engageable with the hook engageable surfaces of said swingable member, and flexible connecting means interconnecting each of said hooks, said flexible connecting means being permanently secured at one end in such manner that it is not separable from one of said hooks, one of said hooks having a shank and a pair of oppositely disposed reversely bent hook forming fingers which extend in directions substantially parallel to the shank, one of said hook forming fingers having a length substantially longer than the other of said hook forming fingers, either one of said hook forming fingers being capable of having excess length of the flexible connecting means wrapped therearound, thereby adjusting the length of said flexible connecting means to secure the swingable member at a selected position with respect to said stationary member.

4. A clamping mechanism for securing a swingable member with respect to a stationary member and wherein the stationary member and swingable member have hook engageable surfaces; said clamping mechanism comprising a first hook engageable with the hook engageable surface of said stationary member, a second hook engageable with the hook engageable surface of said swingable member, and flexible connecting means interconnecting each of said hooks, said flexible connecting means being permanently secured at one end in such manner that it is not separable from one of said hooks, one of said hooks having a shank and a pair of oppositely disposed reversely bent hook forming fingers which extend in directions substantially parallel to the shank, one of said hook forming fingers being rotated to a position approximately 90° about said shank with respect to the other of said hook forming fingers, one of said hook forming fingers having a length substantially longer than the other of said hook forming fingers, either one of said hook forming fingers being capable of having excess length of the flexible connecting means wrapped therearound, thereby adjusting the length of said flexible connecting means to secure the swingable member at a selected position with respect to said stationary member.

5. A clamping mechanism for securing a swingable member with respect to a stationary member and wherein the stationary member and swingable member have hook engageable surfaces; said clamping mechanism comprising a first hook engageable with the hook engageable surface of said stationary member, a second hook engageable with the hook engageable surface of said swingable member, and flexible connecting means interconnecting each of said hooks, said flexible conecting means being permanently secured at one end in such manner that it is not separable from one of said hooks, each of said hooks having a shank, an eyelet in said shank, and a hook forming finger at one end of said shank, one of said hooks having a pair of diametrally opposed outwardly extending arms formed on the shank thereof, and which extend laterally from the shank and are substantially perpendicular to the axis of the shank, said arms being sized to receive excess length of the flexible connecting means, thereby adjusting the length of said flexible connecting means to secure the swingable member at a selected position with respect to said stationary member.

6. A clamping mechanism for securing a trunk lid operatively supported on a load in an automotive vehicle trunk to the trunk forming compartment of said vehicle, and wherein the trunk lid and trunk forming compartment have hook engageable surfaces; said clamping mechanism comprising a first hook engageable with the hook engageable surface of said trunk forming compartment, a second hook engageable with the hook engageable surface of said trunk lid, and a rope interconnecting each of said hooks, said rope being permanently secured at one end in such manner that it is not separable from one of said hooks, each of said hooks having a shank, an eyelet in said shank and a hook forming finger at one end of said shank, one of said hooks having a pair of diametrally opposed outwardly extending arms formed on the shank thereof and which extend laterally from the shank and are substantially perpendicular to the axis of the shank, said arms being sized to receive excess length of the rope, thereby adjusting the length of said rope to secure the trunk lid at a selected position with respect to said trunk forming compartment.

7. A clamping mechanism for securing a trunk lid operatively supported on a load in an automotive vehicle trunk to the trunk forming compartment of said vehicle and wherein the trunk lid and trunk forming compartment have hook engageable surfaces; said clamping mechanism comprising a first hook engageable with the hook engageable surface of said trunk forming compartment, a second hook engageable with the hook engageable surface of said trunk lid, and a rope interconnecting each of said hooks, said rope being permanently secured at one end in such manner that it is not separable from one of said hooks, one of said hooks having a shank and a pair of oppositely disposed reversely bent hook forming fingers which extend in directions substantially parallel to the shank, one of said hook forming fingers being rotated to a position approximately 90° about said shank with respect to the other of said hook forming fingers, said hook being provided with an aperture for accommodating said rope, either one of said hook forming fingers being capable of receiving excess length of the rope for adjusting the length of said rope to secure the trunk lid at a selected position with respect to said trunk forming compartment.

References Cited

UNITED STATES PATENTS

| | | | |
|---|---|---|---|
| 864,652 | 8/1907 | Fing | 24—230.5 |
| 912,566 | 2/1909 | Heisterkamp | 24—131 |
| 1,615,586 | 1/1927 | Kleffman | 24—129 |
| 2,973,217 | 2/1961 | Gregoire | 292—288 |
| 3,011,818 | 12/1961 | Matthiessen | 292—288 |
| 3,158,392 | 11/1964 | Shell | 292—288 |
| 3,238,585 | 3/1966 | Froyd | 24—129 |

MARVIN A. CHAMPION, *Primary Examiner.*

RICHARD E. MOORE, *Examiner.*